United States Patent [19]

Noll

[11] 3,905,929

[45] Sept. 16, 1975

[54] AQUEOUS DISPERSIONS OF POLYURETHANE HAVING SIDE CHAIN POLYOXYETHYLENE UNITS

[75] Inventor: Klaus Noll, Cologne, Germany

[73] Assignee: Bayer Aktiengesellschaft, Leverkusen, Germany

[22] Filed: Mar. 18, 1974

[21] Appl. No.: 452,163

[30] Foreign Application Priority Data

Mar. 23, 1973 Germany............................ 2314512

[52] U.S. Cl. ............... 260/29.2 TN; 260/77.5 AQ; 260/75 NQ; 260/859 R; 260/859 PV
[51] Int. Cl...................... C08g 22/14; C08g 51/24
[58] Field of Search.............................. 260/29.2 TN

[56] References Cited
UNITED STATES PATENTS

| | | | |
|---|---|---|---|
| 2,835,653 | 5/1958 | Haas et al................... | 260/29.2 TN |
| 3,479,310 | 11/1969 | Dieterich et al............. | 260/29.2 TN |
| 3,666,542 | 5/1972 | Kigane et al. ............... | 260/29.2 TN |
| 3,730,927 | 5/1973 | Schloss......................... | 260/29.2 TN |
| 3,769,318 | 10/1973 | Windemuth et al........... | 260/2.5 AT |
| 3,796,678 | 3/1974 | Bartizal ....................... | 260/29.2 TN |

FOREIGN PATENTS OR APPLICATIONS

| | |
|---|---|
| 2,141,805 | Germany |
| 2,141,807 | Germany |

*Primary Examiner*—John C. Bleutge
*Assistant Examiner*—Arthur H. Koeckert
*Attorney, Agent, or Firm*—Joseph C. Gil

[57] ABSTRACT

A polyurethane adapted for making non-ionic aqueous polyurethane dispersions without an added emulsifier is prepared by reacting a conventional organic diisocyanate and an organic compound having groups reactive with isocyanato groups and having a side chain which contains repeating $+O-CH_2-CH_2+$ groups. Latices prepared from the polyurethane may be used to prepare films and coatings having improved physical properties.

9 Claims, No Drawings

AQUEOUS DISPERSIONS OF POLYURETHANE HAVING SIDE CHAIN POLYOXYETHYLENE UNITS

This invention relates generally to polyurethanes and more particularly to an improved polyurethane for making dispersions, to a method for making them and to films and coatings prepared therefrom.

It has been disclosed before that polyurethanes and polyurethane ureas can be emulsified in water with emulsifiers and under the action of high shearing forces to form latices (e.g. as described in U.S. Pat. No. 3,294,724). The preparation of these latices is difficult and requires close technical control of the process. Moreover, the resulting latices have the disadvantage that films produced therefrom have a poor resistance to water because of the use of an emulsifier. The latices also are often not of a sufficiently fine state of subdivision to be stable against irreversible sedimentation of the polyurethane.

Latices prepared with polyurethane ionomers which contain an internal dispersing agent in the form of ionic groups built into the molecule are very finely divided stable dispersions and do not have these disadvantages. These known latices (see e.g. U.S. Pat. No. 3,479,310 or British Pat. Specification No. 1,076,688) have the advantage of possessing the excellent properties of linear polyurethane elastomers, such as high elasticity, high tensile strength, high resistance to hydrolytic influences and weathering and high resistance to exposure to light, combined with the ability to be worked up from solvent-free media. The danger of a fire or explosion because of the presence of a volatile solvent is avoided and moreover, it is not necessary to destroy or recover organic solvents which may be harmful to the health and may adversely affect the environment. Such latices also have a high solids content.

Although these dispersions have already become technically important, they have two properties arising from their nature as polyelectrolytes which are somewhat disadvantageous and may jeopardize their universal acceptance. They are sensitive to electrolytes and to cold temperatures.

Other dispersions have been disclosed and described in German Offenlegungsschrift Nos. 2,141,805 and 2,141,807 in which the dispersibility is brought about not by groups of an ionic nature but by centers which make use of the hydrophilic character of polyethylene oxide ethers. These dispersions, insofar as they do not contain dispersifying groups of an ionic nature, are prepared by reacting a trifunctional isocyanate prepolymer (obtained from a trifunctional polypropylene oxide polyether and the stoichiometrically required quantity of a diisocyanate) with alcohol mixtures which contain monofunctional polyethylene oxide ethers in such a manner that the reaction mixture contains one mol of the mixture of monofunctional alcohols to one mol of isocyanate prepolymer. The resulting mixture which contains NCO-groups is dispersed in water by the action of shearing forces and undergoes an increase in molecular weight due to the conventional reactions between NCO-groups and difunctional reactive hydrogen containing compounds (e.g. diamines). According to the examples given in German Offenlegungsschrift No. 2,141,805 and in Example 4 of German Offenlegungsschrift No. 2,141,807 films produced from these dispersions have ϵ-moduli of about 5 kg.wt./cm² and tensile strengths of about 10 kg.wt./cm² at elongations at break of 200%. Such dispersions are unsuitable for making coatings or coverings having good physical properties because such coatings must have a minumum tensile strength of 150 kg.wt./cm² and minimum elongation at break of about 400%.

It is therefore an object of this invention to provide a completely new method of obtaining polyurethanes which can be dispersed in water without the aid of dispersing agents and polyurethane dispersions obtained from these polyurethanes which are free from the above disadvantages. Another object of the invention is to provide a process for producing non-ionic, aqueous polyurethane dispersions which are free from emulsifiers. Another object of the invention is to provide improved polyurethane latices. Still another object of the invention is to provide polyurethane latices adapted for use in the preparation of coatings or coverings having improved physical properties.

The foregoing objects and others are accomplished in accordance with this invention, generally speaking, by providing a polyurethane having a micromolecular structure including a side chain containing repeating $+O-CH_2-CH_2+$ groups and attached to the micromolecular chain through specific groups described hereinafter.

The polyurethane provided by the invention is prepared by a process wherein an organic diisocyanate is reacted with an organic compound having a molecular weight of from about 500 to about 6,000 which is difunctional for the purpose of the isocyanate polyaddition reaction and contains terminal hydrogen atoms which are reactive with isocyanato groups but does not contain side chain polyethylene oxide units and with an organic compound which is difunctional for the purpose of the isocyanate polyaddition reaction and contains terminal hydrogen atoms which are reactive with isocyanate groups as well as side chain polyethylene oxide units. The reaction mixture may contain, optionally, a conventional chain-lengthening agent having a molecular weight below 500 (hereinafter called "optional chain extender") and other suitable conventional auxiliary agents and additives used in polyurethane chemistry.

The reactions of the organic polyisocyanate with the organic compound having groups containing reactive hydrogen atoms determinable by the Zerewitinoff method having a molecular weight from about 500 to about 6000 and with the chain extender may be conducted under substantially anhydrous conditions and the resulting polyurethane may then be converted later into an aqueous dispersion or the polyurethane may be prepared by a prepolymer process in which an excess of organic polyisocyanate is reacted with the organic compound having reactive hydrogen atoms and a molecular weight of at least about 500 in a first step under substantially anhydrous conditions and the prepolymer is then chain extended in the presence of water while forming a dispersion. Any difunctional organic compound which contains reactive hydrogen atoms and side chain polyethylene oxide units of the following general formula (I) may be used:

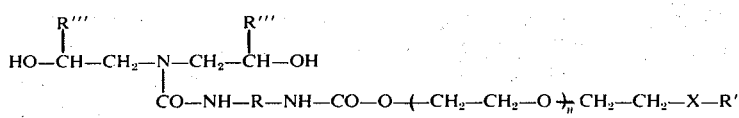

in which
- R represents a divalent group obtained by removing the isocyanate groups from a diisocyanate with a molecular weight of from about 112 to about 1000.
- X represents oxygen or $-NR''-$
- R' and R'' are identical or different and represent a monovalent hydrocarbon group containing from 1 to 12 carbon atoms,
- R''' represents hydrogen or a monovalent hydrocarbon group containing from 1 to 8 carbon atoms, and
- n represents an integer of from 4 to 89.

The invention also provides aqueous polyurethane dispersions obtainable by this process.

The invention also provides a process for producing thermoplastic, non-ionic polyurethane elastomers with a substantially linear molecular structure which are dispersible in water wherein an organic diisocyanate is reacted with a difunctional organic compound having terminal hydrogen atoms which are reactive with isocyanate groups, a molecular weight of from about 500 to about 6,000 which is free from side chain polyethylene oxide units and with a difunctional compound having both terminal hydrogen atoms which are reactive with isocyanate groups and side chain polyethylene oxide units. Conventional chainlengthening agents with a molecular weight below 500 (optional chain-lengthening agents) as well as the usual auxiliary agents and additives customarily used in polyurethane chemistry may also be used. The difunctional organic compounds containing terminal hydrogen atoms which are reactive with isocyanate groups and contain side chain polyethylene oxide units are those of the general formula I given above.

The invention also comtemplates the polyurethanes obtainable by this process.

Any organic diisocyanate of the general formula $R(NCO)_2$ in which R represents an organic group such as can be obtained by removing the isocyanate groups from an organic diisocyanate with a molecular weight of from about 112 to about 1,000, preferably abut 140 to about 400 may be used. Diisocyanates which are particularly suitable for the process provided by the invention are those of the general formula $R(NCO)_2$ in which R represents a divalent aliphatic hydrocarbon group containing 4 to 18 carbon atoms, a divalent cycloaliphatic hydrocarbon group containing 5 to 15 carbon atoms, a divalent aromatic hydrocarbon group containing 6 to 15 carbon atoms or an araliphatic hydrocarbon group containing 7 to 15 carbon atoms. The following are examples of typical representatives of these organic diisocyanates which are particularly suitable for the process according to the invention: tetramethylene diisocyanate, hexamethylene diisocyanate, dodecamethylene diisocyanate, cyclohexane-1,3-diisocyanate, cyclohexane-1,4-diisocyanate, 1-isocyanato-3-isocyanatomethyl-3,5,5-trimethyl cyclohexane and 4,4'-diisocyanatodicyclohexylmethane as well as aromatic diisocyanates such as 2,4-diisocyanatotoluene and 2,6-diisocyanatotoluene and mixtures of these isomers, 4,4'-diisocyanatodiphenylmethane, 1,5-diisocyanatonaphthalene and the like.

Any suitable difunctional organic compound having terminal groups which contains hydrogen atoms determinable by the Zerewitinoff method and has a molecular weight in the range of about 500 to about 6,000, preferably about 600 to 3000, may be used.

Any suitable dihydroxy polyesters known per se in polyurethane chemistry which is obtained by esterification of a dicarboxylic acid such as succinic acid, adipic acid, suberic acid, azelaic acid, sebacic acid, phthalic acid, isophthalic acid, terephthalic acid, tetrahydrophthalic acid, and the like, and diols such ethylene glycol, propylene-1,2-glycol, propylene-1,3-glycol, diethylene glycol, butane-1,4-diol, hexane-1,6-diol, octane-1,8-diol, neopentyl glycol, 2-methylpropane-1,3-diol or the various isomeric bis-hydroxymethyl cyclohexanes and the like may be used.

Any suitable polylactone known per se in polyurethane chemistry, e.g. polymers of $\epsilon$-caprolactone and one of the abovementioned dihydric alcohols may be used.

Any suitable polycarbonate known per se in polyurethane chemistry which may be obtained, for example, by reacting the above-mentioned diols with diaryl carbonates or phosgene may be used.

Any suitable polyether known per se in polyurethane chemistry, e.g. polymers or copolymers of styrene oxide, propylene oxide, tetrahydrofuran, butylene oxide or epichlorohydrin, which polymers or copolymers are prepared from divalent starter molecules such as water, the above-mentioned diols or amines which contain 2 N-H bonds may be used. A certain amount of ethylene oxide may also be used in the preparation of these compounds, provided the polyether used does not contain more than about 10 percent by weight of ethylene oxide. In general, however, polyethers which have been obtained without the addition of ethylene oxide are used.

Any suitable polythioether, polythio mixed ethers and polythioether esters known per se in polyurethane chemistry may be used.

Any suitable polyacetal known per se in polyurethane chemistry, for example those obtained from the above-mentioned diols and formaldehyde may be used.

Any suitable difunctional polyether ester containing terminal groups which are reactive with isocyanate groups may be used.

It is preferred to use dihydroxy polyesters, dihydroxy polylactones and dihydroxy polycarbonates as the organic compound having a molecular weight of at least about 500 in the process according to the invention.

Any suitable chain-lengthening agents having a molecular weight below 500 may be used as optional chain extenders in the process according to the invention for producing the polyurethanes which can be dispersed without the aid of dispersing agents such as, for example, the low-molecular weight diols which have been described for the preparation of dihydroxy polyesters and the like, or also diamines such as diaminoethane, 1,6-diaminohexane, piperazine, 2,5-dimethyl piperazine, 1-amino-3-aminoethyl-3,5,5-trimethyl-cyclohexane, 4,4'-diaminodicyclohexylmethane, 1,4-diaminocyclohexane or 1,2-propylenediamine or also hydrazine, aminoacid hydrazides, hydrazides of semicarbazidocarboxylic acids, bis-hydrazides, bis-semicarbazides, and the like.

In order to synthesize the new self-dispersible polyurethanes, it is an essential feature of the invention to use organic compounds which contain both hydrogen atoms capable of reacting with isocyanate groups and side chain ethylene oxide units, as represented by the above general formula I.

These compounds having ethylene oxide derived side chains which are essential to the invention will hereinafter be referred to as "hydrophilic chain-lengthening agents."

Preparation of the hydrophilic chain-lengthening agents may be carried out, for example, as follows:

Monovalent alcohols or monovalent phenols of the general formula $R'—X—H$ ($X = O$) are first prepared in known manner or the corresponding monovalent alcohols containing polyethylene oxide units as represented by the formula $$HO-(CH_2—CH_2—O)_{\overline{n}}CH_2—CH_2—X—R' \qquad (II)$$

are prepared by ethoxylation of secondary amines of the general formula $R'—X—H$ ($X$ —$NR''$—). In the above formula II, $R'$ and $R''$ represent identical or different hydrocarbon groups, in particular $C_1$ to $C_{10}$ alkyl groups, $C_4$ to $C_8$ cycloalkyl groups, $C_6$ to $C_{12}$ aryl groups or $C_7$ to $C_{10}$ aralkyl groups.

Any suitable alcohol or phenol may be used such as, for example, methanol, ethanol, n-propanol, n-hexanol, n-decanol, isopropanol, tertiary butanol, phenol, p-cresol, benzyl alcohol or the like. Any suitable secondary amine may be used such as, for example, dimethylamine, diethylamine, dipropylamine, N-methylhexylamine, N-ethyl-decylamine, N-methyl-aniline, N-ethylbenzylamine, N-methylcyclohexylamine, or the like.

The quantity of ethylene oxide grafted into the molecule may vary within wide limits. The polyethylene oxide chains generally consist of from about 5 to about 90 and preferably about 20 to about 70 ethylene oxide units.

In the second reaction stage, the resulting monovalent alcohols which contain polyethylene oxide units are reacted with a large excess of one of the diisocyanates of the general formula $R(NCO)_2$ given above as examples, followed by removal of the diisocyanate excess to obtain the corresponding monoisocyanate which contains polyethylene oxide units as represented by the general formula $$OCN—R—NH—CO—O-(CH_2—CH_2—O)_{\overline{n}}CH_2—CH_2—X—R' \qquad (III)$$

In this second reaction step, the diisocyanate is preferably used in a 2 to 10-times molar excess, preferably a 3 to 4-times molar excess, in order to prevent the formation of the corresponding bis-urethanes which are free from NCO-groups. This second reaction step is preferably carried out by adding the monovalent alcohol which contains polyethylene oxide units to the diisocyanate in the reaction vessel. The reaction may be carried out at from about 70° to about 130°C. Subsequent removal of the diisocyanate excess is preferably carried out by thin-layer vacuum distillation at about 100°C to about 180°C.

The hydrophilic chain-lengthening agent is then obtained in the third reaction step by reacting the above described monoisocyanates which contain polyethylene oxide units with dialkanolamines of the general formula $$HO—\overset{R'''}{\underset{|}{C}H}—CH_2—NH—CH_2—\overset{R'''}{\underset{|}{C}H}—OH \qquad (IV)$$

in which $R'''$ has the meanings already indicated above. In this third reaction step, the reactants are preferably used in stoichiometric proportions. This step of the reaction is preferably carried out at temperatures between about 0° and about 50°C, preferably at about 15° to about 30°C. Suitable dialkanolamines of the general formula shown above are, for example, diethanolamine, dipropanolamine ($R''' = CH_3$), bis-(2-hydroxy-2-phenyl-ethyl)-amine and the like.

The use of components which are exclusively difunctional is an essential feature of the process according to the invention for producing the self-dispersible polyurethanes and for preparing non-ionic polyurethane dispersions. As is known from the chemistry of high polymer latices, however, in some cases the addition of very small quantities of trifunctional low-molecular weight compounds, e.g. trifunctional isocyanates or trifunctional chain-lengthening agents, may improve the properties of the product. However, such trifunctional components should not be used in quantities of more than one equivalent percent, based on all the building components which take part in the polyaddition reaction.

The process provided by the invention for producing the self-dispersible polyurethanes may be carried out by the known methods of polyurethane chemistry, either by the one-stage process or by the two-stage process (prepolymer process).

The reactants for producing the self-dispersible polyurethanes may be used in an equivalent ratio of isocyanate groups to groups which are reactive with isocyanate groups of between about 0.8:1 and about 2.5:1, preferably between about 0.95:1 and about 1.5:1. If an excess of NCO is used, the compounds obtained obviously contain NCO-groups which when the compounds are converted into an aqueous dispersion continue to react with water by a chain-lengthening reaction to yield the dispersed end product. The equivalent ratios given above therefore include all the components which take part in the synthesis of the polyurethanes according to the invention, including the chain-lengthening agent with amino groups which may be used in the form of aqueous solutions (see the method described below for producing polyurethane dispersions by the prepolymer process) but not including that proportion of the water used for dispersing the polyurethanes which reacts by a chain-lengthening reaction with any compounds present which contain NCO-groups.

The hydrophilic chain-lengthening agents may be used in quantities in the process according to the invention so that the finished polyurethane contains about 3 to about 30% by weight preferably about 5 to about 20% by weight, of side chain polyethylene oxide segments.

Both the one-stage method and the two-stage method of the process may be carried out either with or without solvents. Any suitable organic solvent may be used, especially if production of the polyurethanes is intended to be accompanied or followed by conversion of the polyurethanes into an aqueous dispersion, including, for example, those solvents which are miscible with water and inert towards isocyanate groups and have a boiling point below 100°C, for example, acetone or methyl ethyl ketone.

If the one-stage process is employed, the difunctional organic compounds which have a molecular weight of from about 500 to about 6,000 and contain groups capable of reacting with isocyanate groups, are preferably mixed with the hydrophilic chain-lengthening agent and with the optional chain-lengthening agent having a molecular weight below 500. The chain-lengthening agents with a molecular weight below 500 which are optionally used in the one-stage process may be the diols disclosed above for the preparation of dihydroxy polyesters. The diisocyanate component is then added to the resulting mixture without solvents, and reaction of the mixture is then brought about, preferably at temperatures of about 50° to about 150°C, optionally after the addition of catalysts commonly used in polyurethane chemistry. The quantity of diisocyanate component used is such that the NCO/OH-ratio is between about 0.8 and about 1.05. The viscosity of the mixture rises during the reaction, and one of the aforementioned solvents is therefore gradually added to the mixture. An organic solvent solution of the completely reacted polyurethane is thus obtained and the concentration of this solution is preferably adjusted to a solids content of about 10 to about 50 percent by weight, preferably about 15 to about 40 percent by weight.

Conversion of the dissolved polyurethane elastomers into an aqueous dispersion may then be carried out conveniently by adding water to the stirred solution. In many cases, the solution then passes through the phase of a water-in-oil emulsion until it passes a viscosity maximum, at which point there is a sudden changeover into an oil-in-water emulsion. After removal of the solvent by distillation, a purely aqueous stable dispersion is left behind.

If the two-stage process is employed, an NCO prepolymer is preferably first prepared from excess diisocyanate, a higher molecular weight compound with groups capable of reacting with isocyanate groups of the type described above and hydrophilic chain-lengthening agent, using either a solvent-free melt of the reactants or using solvents and maintaining an NCO/OH-ratio of between about 1.1:1 and about 3.5:1, preferably between about 1.2:1 and about 2.5:1. If no solvent is used, the NCO prepolymer is preferably taken up in a suitable solvent. The resulting solution of prepolymer may then be reacted in known manner with the optional chain-lengthening agent which has a molecular weight below 500 such as those given as examples above. To prepare the polyurethane dispersions according to the invention, it is advisable to use a special variation of the two-stage process in which the chain-lengthening agent, in this case preferably one of the above-mentioned diamines or hydrazine derivatives, dissolved in a small quantity of water or a mixture of water and solvents, is added to the above-described solution of the NCO prepolymer in such quantities that the NCO/OH ratio is between about 2.5 and about 1.05. This reaction may be carried out at room temperature or preferably at about 250° to 60°C. Subsequent addition of the remainder of the water followed by removal of the solvent yields the polyurethane dispersion. In this variation of the process, the optional chain-lengthening agent may, if desired, be dissolved in the total quantity of water subsequently present in the dispersion (50 to 200% by weight based on solid polyurethane).

In principle, the polyurethane elastomers provided by the invention can also be converted into dispersions by other methods, for example, dispersion can be carried out without using solvents, e.g. by mixing the solvent-free elastomer melt with water in an apparatus which is capable of producing high shearing gradients, or it can be carried out with very small quantities of solvents to act as plasticizing agents, again using the same apparatus, or it can be carried out with the aid of non-mechanical dispersing agents such as sound waves of extremely high frequency. Also, in the case of polyurethane ureas, chain-lengthening can be carried out after conversion of the propolymer into an aqueous emulsion.

Polyurethane dispersed in accordance with the invention have an average particle size of about 0.5 m$\mu$ to about 5m$\mu$, preferably about 100 to 500 m$\mu$, the optical dispersion or Tyndall effect obviously beginning to appear at dispersions with particle sizes below 500 m$\mu$.

The rheological characteristics of the dispersions, which will not be discussed in detail here, depend on the particle size and the concentration of the dispersion. As the particles become very small, the viscosity increases and moreover with particles measuring less than about 100 m$\mu$, the flow limit progressively increases with decreasing particle size (Bingham body). Regardless of this relationship, the viscosity increases with increasing concentration which may be as high as 70% in this class of dispersions, the viscosity in some cases reaching a value of 50 cP.

The dispersions are insensitive to electrolytes and consequently the latex particles may be subjected, for example, to acid catalyzed cross-linking with formaldehyde or formaldehyde derivatives; they may also be pigmented with electrolytically active pigments or dyes. Another property of the dispersions provided by the invention is their ability to be coagulated by heat which enables them to be worked up into foils or films which are permeable to water vapor simply by heating them.

The dispersions may be blended with other dispersions, e.g. with dispersions of polyvinyl acetate, polyethylene, polystyrene, polybutadiene, polyvinyl chloride, co-polymer synthetic resins or the like.

Any suitable dispersion of filler, plasticizer, pigment, carbon black, silica sol, aluminium, clay, asbestos or the like may also be incorporated in the dispersions.

The dispersions of the polyurethane compounds are stable in water and can be stored and transported and worked up at any later date, e.g., into shaped products. They generally dry directly to dimensionally stable synthetic coatings although the products of the process may also be shaped in the presence of known cross-linking agents. The polyurethanes obtained vary in their properties according to the elected chemical composition and the urethane group content. They may be obtained in the form of soft, sticky compounds or thermoplastic or rubbery elastic products within a wide range of hardness up to glass-hard duroplasts. The hdrophilic character of the products may also vary within wide limits. The elastic products can be worked thermoplastically at elevated temperatures, for example 100° to 180°C.

The products of the process are suitable for coating, covering or impregnating woven or non-woven textiles, leather, paper, wood, metal, ceramic, stone, concrete, bitumen, hard fiber, straw, glass, porcelain, synthetic resins of various kinds of glassfibers to produce antistatic and crease-resistant finishes or they may be used as binders for fleeces, adhesives, adhesifying agents, laminating agents, agents to render products hydrophobic, plasticizers or binders, e.g. for corkmeal or sawdust, glassfibers, asbestos, paper-type materials, plastics or rubber waste or ceramic materials or as auxiliary agents in clothprinting and in the paper industry, as adhesives for polymers, as sizing agents, e.g., for glass fibers, and for finishing leather.

For these purposes, the dispersions or pastes are preferably applied to a porous support which subsequently remains bonded to the finished product, e.g. woven or non-woven textiles or fiber mats, felts or fleeces or also paper fleeces, foam plastics foils or split leather, substances which cause immediate solidification of the coating by virtue of their absorbent action. The materials are then dried at elevated temperature and if necessary pressed. Drying may also be carried out on smooth, porous or non-porous materials such as metal, glass, paper, cardboard, ceramic materials, sheet steel, silicone rubber or aluminium foil, in which case the finished sheet product is then lifted off and used as such or applied to a substrate by the reversal process by glueing, flame-laminating or calendering. Application by the reversal process may be carried out at any time.

The properties of the products of the process can be modified by the addition of vinyl polymers or active or inactive fillers, for example polyethylene, polypropylene, polyvinyl acetate or ethylene/vinyl acetate copolymers which may be saponified or partly saponified and/or grafted with vinyl chloride; styrene/butadiene copolymers, ethylene (graft) copolymers, carbon black, silica, asbestos, talcum, kaolin, titanium dioxide, glass in the form of powder or fibers, and cellulose. The end product may contain up to 70% of such fillers, based on the total quantity of dry substances, depending on the required properties and the purpose for which the end products are to be used.

Dyes, pigments, plasticizers or additives which influence the flow properties may, of course, also be added.

After the products have been applied by the various techniques, they may be dried at room temperature or at elevated temperature. The drying temperature to be selected in each individual case, which depends not only on the chemical composition of the material but above all on the moisture content, the drying time and the thickness of the layer, can easily be determined by a preliminary test. For any given heating time, the drying temperature must in any case be below the solidification temperature.

The sheet structures may be coated subsequently with a finish to increase the resistance of the surface. Aqueous dispersions or solutions are again preferably used for this purpose.

Very hard polyurethanes obtained from finely divided dispersions and sols are suitable for use as stoving lacquers and in some cases even as air-drying lacquers. They combine the advantages of great hardness and elasticity with high gloss, and when used with aliphatic diisocyanates they also have high light fastness and resistance to weathering.

The following examples serve to describe the composition and preparation of some physical properties of the products.

EXAMPLE 1

Three hundred and seventy parts of a linear polyester diol of adipic acid, hexanediol and 2,2-dimethylpropane-1,3-diol having an OH-number of about 66 were mixed with 53 parts of a compound (hereinafter termed dispersing agent A) of one mol of a polyethylene oxide ether with OH-number 48 which had been initiated on n-butanol, one mol of hexamethylene-1,6-diisocyanate and one mol of bis-($\beta$-hydroxyethyl)-amine, and to this mixture were added 111 parts of 3-isocyanatomethyl-3,5,5-trimethyl-cyclohexylisocyanate and the mixture was heated to a temperature of 100°C. Heating was continued for 3 hours with stirring and the exclusion of atmospheric moisture. The isocyanate content of the mixture dropped to 4.7% during this time. The mixture was then cooled to 60°C and diluted with 1,020 parts of acetone.

A solution of 15 parts of diaminoethane in 125 parts of water was prepared and rapidly added to the reaction solution and homogeneously mixed with stirring. 700 parts of water were rapidly added with vigorous stirring to the resulting clear solution which contained 35% solids, a milky white dispersion of the solid in water being formed. The dispersion contained acetone and it had a brownish, translucent appearance when viewed in thin layers. After removal of the acetone by distillation under a pressure of 100 mm.Hg, a pure, aqueous dispersion of the polyurethane urea solid was left behind. It had a solid content of 40%.

The solid of this dispersion contained 7.7% by weight of polyethylene oxide ether units.

When the dispersion was poured out to form a film 100 $\mu$ in thickness and the water was completely removed by evaporation, a clear, smooth, elastic film 40 $\mu$ in thickness was obtained. It had the following mechanical properties:

| | |
|---|---|
| Tensile strength: | 180 kg.wt./cm$^2$ |
| Elongation at break: | 910 % |

The products of Examples 2 to 19 summarized in the following table were prepared by the process described in Example 1.

Table 1

Examples 2 – 19

| I Macrodiol | II Dispersing agent | III Diisocyanate | IV Equivalent ratio NCO/OH based on I, II and III | Chain lengthening agent | Equivalent ratio concentration NCO/NH based on prepolymer and chain-lengthening agent | concentration solid | Concentration of polyethylene oxide units (% by weight) in polyurethane | Tensile strength/ elongation at break | Example No. |
|---|---|---|---|---|---|---|---|---|---|
| Polyester of hexane diol, 2,2-dimethyl-propane-diol Adipic acid OH-number 66 | B | D/E* | 2.0 | G/H** | 1.25 | 40% | 8.6 | 210/820 | 2 |
| | B | D/E* | 2.2 | G/H** | 1.33 | 50% | 5.1 | 260/730 | 3 |
| | B | D/E* | 2.0 | G | 1.4 | 50% | 5.8 | 190/900 | 4 |
| | B | D/E* | 2.0 | I | 1.25 | 40% | 8.5 | 250/640 | 5 |
| | B | E | 2.0 | I | 1.25 | 40% | 8.6 | 170/1070 | 6 |
| | A | D | 2.0 | H | 1.1 | 40% | 7.4 | 198/730 | 7 |
| | C | D | 2.0 | G | 1.0 | 40% | 8.4 | 170/800 | 8 |
| Polyester of hexane diol, acid OH-number 130 | C | D | 2.0 | L | 1.0 | 35% | 14.0 | 180/600 | 9 |
| | B | D | 2.0 | G/H** | 1.25 | 40% | 13.0 | 190/580 | 10 |
| | A | D | 2.0 | L | 1.0 | 40% | 6.85 | 200/830 | 11 |
| Polyester of butane diol, adipic acid OH-number 117 OH-number 50 | B | D/E* | 2.5 | H | 1.7 | 40% | 9.6 | 170/920 | 12 |
| | C | D/E* | 2.5 | L | 1.25 | 40% | 11.6 | 230/640 | 13 |
| | C | D/E* | 3.3 | G | 1.25 | 35% | 11.3 | 240/810 | 14 |
| Polyester 1 of ethylene glycol, adipic acid, phthalic acid, OH-number 65 | B | D/E* | 2.5 | G | 1.4 | 30% | 8.6 | 175/630 | 15 |
| Polyester 2 of diethylene glycol, adipic acid OH-number 40 Polycarbonate of hexanediol OH number 56 | B | D/E* | 2.2 | G | 1.25 | 40% | 7.6 | 350/640 | 16 |
| | B | D/E* | 2.2 | G/H** | 1.25 | 40% | 7.8 | 320/510 | 17 |
| | B | D/E* | 2.2 | I | 1.25 | 40% | 7.5 | 250/740 | 18 |
| Polycarbonate of hexanediol tetramethylene glycol OH number 90 | B | D/E* | 3.0 | H | 1.1 | 40% | 7.7 | 220/460 | 19 |

A: see example 1
B: same as dispersing agent A (example 1) OH-number of polyether 29
C: same as dispersing agent A (example 1) OH-number of polyether 25.5
D: 3-isocyanatomethyl-3,5,5-trimethyl-cyclohexyl isocyanate
E: hexamethylene-1,6-diisocyanate
G: 3-aminomethyl-3,5,5-trimethyl cyclohexylamine
H: hydrazine monohydrate
I: 4,4'-diaminodicyclohexylmethane
L: diaminoethane
*molar ratio : 1:1
*molar ratio : 1:1

EXAMPLE 20

234 parts of a polyester diol of adipic acid and diethylene glycol with OH-number approximately 40 are mixed with 49.5 parts of "dispersing agent A" from Example 1 in the solventfree melt at 60°C. 15.7 parts of butane-1,4-diol were then added and also homogeneously mixed. 25.2 parts of an 80:20 mixture of tolylene-2,4-diisocyanate and tolylene-2,6-diisocyanate were then added all at once to this mixture with stirring. The temperature was then raised to 90°C. The viscosity of the mixture then rapidly rose and reached a value of about 20,000 cP in 15 minutes. 50 parts of acetone were then added, whereupon the temperature dropped to about 70°C with vigorous boiling. The viscosity fell at this stage but then started to increase again slowly, whereupon a further 50 parts of acetone were added.

This process was repeated until 6,000 parts of acetone had been added. A clear solution of a polyester polyurethane in acetone with a solids content of 35% was obtained. This solution was cooled to 30°C and 525 parts of water were then added all at once with vigorous stirring. A bluish-white, medium viscosity dispersion of the solid in the acetone/water mixture was formed. After removal of the acetone under a vacuum of 100 mm.Hg, a viscous purely aqueous dispersion of the polyester polyurethane solid remained behind. It had a concentration of 40%. The solid contained 11.4% of the polyethylene oxide polyether which had been initiated on butanol.

When the dispersion was poured out to form a film 100 μ in thickness from which the water was then completely removed by evaporation, a clear, elastic, very soft and slightly sticky film was left behind which had a thickness of 40 μ and the following mechanical properties:

Tensile strength: 170 kg.wt./cm²
Elongation at break: 1090 %

The products in the following examples 21 and 22 were prepared by the process described in Example 20.

about 6,000 and is free from side chain polyethylene oxide units and with an organic compound which is difunctional for the purpose of the isocyanate polyaddition reaction, contains terminal hydrogen atoms which are reactive with isocyanate groups and contains side chain polyethylene oxide units, said organic compound containing side chain polyethylene oxide units having the formula

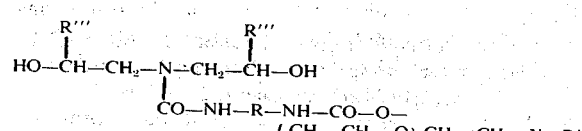

in which

Table 2

| Macrodiol I | Dispersing agent II | Diisocyanate III | Equivalent ratio NCO/OH based on I and III | Chain-lengthening agent | Equivalent ratio NCO/NH based on prepolymer and chain-lengthening agent | Concentration | Concentration of polyethylene oxide units (% by weight) in polyurethane solid | Tensile strength elongation at break | Example No. |
|---|---|---|---|---|---|---|---|---|---|
| Polyester of ethylene glycol, adipic acid OH-number 56 | A | F | 3.0 | K | 0.99 | 40% | 11.2 | 205/980 | 21 |
| Polyester of butane diol, adipic acid OH-number 50 | M | F | 3.3 | K | 1.1 | 40% | 8.8 | 185/1000 | 22 |

A: see table 1
M: same as dispensing agent A (example 1) OH-number of the polyether 32
F: 80:20 mixture of tolylene-2,4- and -2,6-diisocyanate
K: butane-1,4-diol Any of the other organic compounds having a molecular weight of from about 500 to about 6,000, optional chain-lengthening agents, hydrophallic chain lengthening agents and organic polyisocyanates disclosed as suitable herein may be substituted into the foregoing examples. Other suitable components for making the polyurethanes are disclosed in U.S. Pat. No. 3,479,310 granted November 18, 1969 and in the book by Saunders and Frisch: "Polyurethanes Chemistry and Technology" published by Interscience Publishers, Copyright 1962, the disclosures of which are incorporated herein by reference thereto.

Although the invention has been described in detail for the purpose of illustration, it is to be understood that such detail is solely for that purpose and that variations therein can be made by those skilled in the art without departing from the spriit and scope of the invention except as it may be limited by the claims.

What is claimed is:

1. A process for making non-ionic aqueous polyurethane dispersions free from emulsifier which comprises reacting an organic diisocyanate and an organic compound which is difunctional for the purpose of an isocyanate polyaddition reaction, contains terminal hydrogen atoms which are reactive with isocyanate groups, has a molecular weight range of from about 500 to R represents a divalent group obtained by removing the isocyanate groups from a diisocyanate with a molecular weight of from about 112 to about 1000,
X represents oxygen or —NR″—
R′ and R″ are identical or different and represent monovalent hydrocabon groups containing 1 to 12 carbon atoms,
R‴ represents hydrogen or a monovalent hydrocarbon group containing 1 to 8 carbon atoms and
$n$ represents an integer of from 4 to 89.

2. A polyurethane dispersion prepared by the process of claim 1.

3. A process for producing thermoplastic non-ionic polyurethane elastomers which are dispersible in water and have a substantially linear molecular structure which comprises reacting an organic diisocyanate with an organic compound which is difunctional for the purpose of an isocyanate polyaddition reaction, contains terminal hydrogen atoms which are reactive with isocyanate groups, has a molecular weight of from about 500 to about 6,000 and is free from side chain polyethylene oxide units and with an organic compound which is difunctional for the purpose of an isocyanate polyaddition reaction and contains terminal hydrogen atoms which are reactive with isocyanato groups and side chain polyethylene oxide units, said compound containing side chain polyethylene oxide units having the general formula

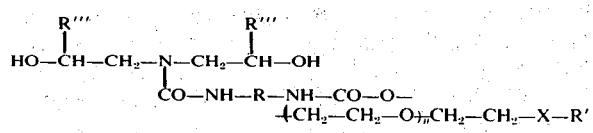

in which
R represents a divalent group obtained by removing the isocyanate groups from a diisocyanate with a molecular weight of from about 112 to about 1000,
X represents oxygen or —NR'—,
R' and R'' are identical or different and represent monovalent hydrocarbon groups containing 1 to 12 carbon atoms,
R''' represents hydrogen or a monovalent hydrocarbon group containing 1 to 8 carbon atoms, and
$n$ represents an integer of from 4 to 89.

4. The product of the process of claim 3.

5. A process for making a polyurethane which is adapted to be dispersed in water without an emulsifying agent which comprises reacting an organic diisocyanate with an organic compound having reactive hydrogens as determinable by the Zerewitinoff method and having a molecular weight of from about 500 to about 6,000 which is substantially free from units derived from ethylene oxide and a hydrophilic chain lengthening agent having the formula

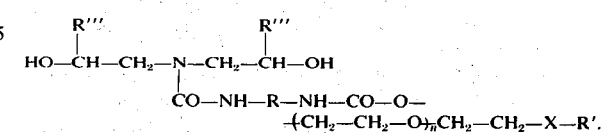

6. The process of claim 1 wherein a difunctional organic compound having hydrogen atoms reactive with isocyanato groups, a molecular weight of below 500 and free from groups derived from ethylene oxide is included in the reaction mixture.

7. The process of claim 3 wherein a difunctional organic compound having hydrogen atoms reactive with isocyanato groups, a molecular weight of below 500 and free from groups derived from ethylene oxide is included in the reaction mixture.

8. The process of claim 5 wherein a difunctional organic compound having hydrogen atoms reactive with isocyanato groups, a molecular weight of below 500 and free from groups derived from ethylene oxide is included in the reaction mixture.

9. A process for making dispersions which comprises dispersing the product of claim 5 in water.

* * * * *